United States Patent [19]

Foss

[11] 3,751,829

[45] Aug. 14, 1973

[54] COLOR ORDER SYSTEM

[75] Inventor: Carl E. Foss, Princeton, N.J.

[73] Assignee: Kollmorgen Corporation, Hartford, Conn.

[22] Filed: Apr. 28, 1972

[21] Appl. No.: 248,454

[52] U.S. Cl. .................. 35/28.3

[51] Int. Cl. .................. G09b 19/00

[58] Field of Search .................. 35/28.3, 28.5

[56] References Cited

UNITED STATES PATENTS

| | | | |
|---|---|---|---|
| 2,409,285 | 10/1946 | Jacobson | 35/28.3 |
| 3,474,546 | 10/1969 | Wedlake | 35/28.3 |

*Primary Examiner*—Harland S. Skogquist
*Attorney*—Frederick E. Bartholy

[57] ABSTRACT

The present invention provides a series of color charts or color order system in which the colors shown in any one of the color charts are obtained by systematic variations of the combination of three or more primary colorants, and are colors that are represented by a portion of the surface of one of a series of concentric and similarly oriented cubic volumes of the color-order space. The basic color-order space is cubic and has a coordinate system of three axes, each of which represents varying amounts of one of the primary colorants. The surface of the basic color cube or any of the series of progressively smaller concentric cubes is divided into several parts by a number of planes that intersect the surfaces of the cube in such a way that each part consists of contiguous portions of more than one face of the color cube. These colors are then represented by projection in a single two-dimensional color chart.

8 Claims, 13 Drawing Figures

COLOR ORDER SYSTEM

BACKGROUND OF THE INVENTION

1. Field of the Invention

The present invention is directed to a system for displaying the various colors which may be obtained by combining several primary colorants in various amounts and proportions, using systematic samplings, each of which consists of a variety of colors that are represented by contiguous portions of two or more faces of one of a series of concentric cubic volumes of a defined spatial representation of colorant mixtures. A basic set of such color charts provides a uniform sampling of the limit colors or most extreme colors that can be produced by the colorant system. The basic charts can be arranged in any of a variety of ways to provide a continuous two-dimensional representation of all of the limit colors. Other color charts are provided that consist of similarly arranged colors that differ from the limit colors by a proportionally constant amount in their formulation. A series of such sets of color charts containing colors that differ from the limit colors by progressively greater amounts provides a unique, uniform, and complete sampling of all colors that are producible by the system of colorants.

2. Description of the Prior Art

It has been known to utilize color specification systems to permit color matching, location, identification and duplication in all the forms of the color printing field. The system of colorants is generally based upon a number of primaries or components greater than two, and in particular, utilizes a set of three colorants having appropriate light absorption characteristics, examples of which are cyan, magenta, and yellow. These three dyes or inks are commonly utilized over a white base or substrate which may be considered a fourth, but dependent, primary. With the use of the three primary colorants having appropriate minimum light-scattering characteristics and an independently variable colorant density application means, a wide range of resultant colors can be produced when they are applied to a base or substrate having appropriate minimum light-absorption characteristics that are sufficiently less than the similar absorption characteristics of the primary colorants. With the use of an appropriate set of three primary colorants and the substrate, it is well known that the composite of yellow and magenta will produce red; yellow and cyan will produce green; magenta and cyan will produce blue; and cyan and magenta and yellow will produce black. With these basic primary colorants a full range of colors may be produced that are commonly adequate to represent most of the various colors of objects.

All of the colors that can be obtained by combining three such primaries in various amounts and proportions can be represented in a three-dimensional geometric ordering that is called a color solid. If the position along each of three mutually perpendicular dimensions or directions represents the effective amount of a different one of the three primary colorants, ranging from no colorant to the maximum effective amount, the color solid takes the form of a cube as can be seen in FIG. 1. One corner of this cube, labeled White, represents the color of the particular base of this illustrative case with no addition of any of the three primary colorants. The three edges of the cube that intersect at this corner represent three vectors or directions in the color solid, each of which represents the addition of an effective amount of one of the three primaries to the white base. Thus, points along any one of these three edges represent colors obtained when an effective amount (from 0 up to 1.0, which represents the maximum effective amount) of one of the primaries is added to the white base with no admixture of any of the other two primaries. Points on any one of the faces of the cube that meet at the white point represent colors obtained by applying various combinations of effective amounts of two of the primaries without any of the third. For example, a point 2, on the top face of the cube in FIG. 1 represents a green color obtained by applying an effective amount, $y_i$, of the yellow primary and an effective amount, $c_i$, of the cyan primary on the white base.

Points that lie within the cubic color solid represent colors obtained with the application of various effective amounts of the three primaries on the white base. That is, the color, $i$, shown in FIG. 1 is obtained by application of $y_i$ of the yellow, $c_i$ of the cyan, and $m_i$ of the magenta primaries. Thus, the color solid represents all of the colors that can be produced by the application of various effective amounts of the three primaries over the white base.

As has been noted above, in part, this ordering of colors in a cubic solid has a number of interseting properties. Each of the eight corners or vertexes is of special significance: two opposite corners are white and black, representing minimum and maximum amounts, respectively, of the three primaries; three others that lie at the ends of the three edges that meet at the white point represent the three primary colorants in their maximally effective form; and the remaining three corners represent the three colors, red, green and blue, that are obtained with mixtures of the maximally effective amounts of two of the colorants. Each of the six faces of the cube represents limit colors that are obtained when one of the primaries is held constant in either its minimum or maximum amount and the other two are varied. Opposite corners of the cube represent pairs of colors that are usually considered complementary. In addition, with the common system of colorants described above, one of the diagonals connecting opposite corners of the cube is of special significance; the diagonal that connects the white corner with its opposite, black, represents all of the colors that are obtained when the effective amounts of the three primaries are equal.

Owing to the difficulty of providing three-dimensional charts or collections of color samples, most color charts provide two-dimensional arrays of colors that represent various ordered sub-sets of colors from the color solid. Generally color variations are provided on successive charts that represent plane sections of a cubic order. For example, a patent granted to William C. Huebner, U.S. Pat. No. 1,703,449 (1929) provides a series of ordered sets of colors, each set of which is obtained when one of the primaries is held at one of a series of constant values while the other two primaries are varied. This system of color specification may be described as a series of parallel plane sections of the color solid. This has a disadvantage of providing limit colors on only two planes, while all of the other limit colors are shown on the perimeters of his remaining intermediate charts.

The H. E. Ives U.S. Pat. No. 2,128,676 (1938) discloses a method which provides better treatment of the color order, but still shows only a partial treatment of the color range of a set of three primaries. The three faces of the color solid that are shown are those that meet at the white point. Thus, white appears in the center of the Ives chart.

Similarly, the Wedlake U.S. Pat. No. 3,474,546 (1969) provides only a partial treatment of the color range of a set of three chromatic primaries, but adds a progressive modification with a black colorant component in increasing density steps. This patent describes a method of illustrating the range of colors obtainable by mixtures of two of the chromatic primaries and a black colorant.

SUMMARY OF THE INVENTION

It is useful to show in a single chart, or in a related series of charts, a desired sampling of the entire set of colors that form the limits or surface of the color solid. These are the most widely variant colors that can be produced by the set of colorants. It is also useful to show, with the same type of geometric ordering, other sub-sets of colors from the color space that differ by a desired amount from these limit colors. It is further useful that a related series of such sub-sets be provided to the point where the maximum difference from the limit colors is reached, that is, until an equal colorant contribution point midway between white and black is reached. It is further useful that each chart represent a unique selection of colors such as is obtained by including colors from more than one face of the color solid.

The present method and apparatus satisfies all of the conditions above. It involves representing, in each related series of charts, those colors that lie on portions of the surfaces of a series of concentric cubic volumes of color space, each such cubic volume being similarly oriented and centered in the color space and representing a constant difference in its linear dimensions from the next members of the series.

The colors that constitute the surfaces of each of these cubic volumes can be described quantitatively as follows: If the coefficients $c$, $m$, and $y$ represent the effective printing densities of the primary colorants and these are assigned proportional values ranging from 0, representing the absence of such primary, to 1.0, representing the maximally effective amount; then each face of the total color solid consists of all colors for which a particular one of the primary coefficients is equal to zero for which it is equal to 1.0. The entire surface of this cube thus consists of all colors for which the effective amount of at least one of the primary coefficients is equal to 0 or 1.0.

Now consider a smaller cubic volume of the color space, as shown by the dotted cube in FIG. 2, that is concentric with the limit-color cube and is so oriented that each of its faces is parallel to the corresponding face of the limit-color cube, with a constant displacement, $d$, between the corresponding faces. The entire surface of such a volume consists of all colors for which at least one of the primary coefficients is equal to $d$ or $(1\text{-}d)$ and the remaining primary coefficients have values ranging from $d$ to $(1\text{-}d)$.

Smaller and smaller cubes can thus be formed by increasing the value of $d$, until the value $d = 0.5$ is reached. At this point the centroid of the limit color cube has been reached, the volume of the smallest cube is zero, and the single color represented by it is that which is obtained with an amount of 0.5 of each of the three primaries, and which, in optimum situations is a medium gray. Thus, it can be seen that all of the surface colors of any one of these smaller cubes represent a constant proportionate distance from the centroid of the color solid to the corresponding limit colors. Therefore, these colors have a common characteristic that serves as a useful basis for their systematic arrangement in a color chart.

The entire collection of surface colors of any of these cubes can be most effectively displayed by dividing them into a number of related groupings, the collection of which may be arranged in a variety of systemic ways by juxtaposition at their common borders. In the most useful divisions of the cubic surface into groupings or areas, each contains portions of more than one face of the cube, and is shown in the form of a plane projection that affords a useful geometric array.

DESCRIPTION OF THE PREFERRED EMBODIMENT

In a preferred embodiment of the invention, the color cube is successively divided by three planes as shown in FIG. 3. Each of these planes passes through both the white point and the black point and another pair of opposite corners. If we again refer to the proportional effective densities, $c$, $m$, and $y$, of the primary colorants, the quantitative specification of these planes is as follows: the plane shown in FIG. 3*a* consists of all colors for which $c = m$; the plane shown in FIG. 3*b*, those for which $c = y$; and the plane shown in FIG. 3*c* those for which $y = m$. The complete dissection of the color cube by these planes is indicated in FIG. 3*d*. The cube is thus divided into six related tetrahedral volumes, an example of which is shown in FIG. 3*e*.

The surface of the cube is likewise divided into six related parts, each of which consists of adjacent triangular halves of two adjacent faces of the color cube. The quantitative description of the colors in each of the six complementary groups is shown below. Each of the six groups consists of all colors that meet both the conditions listed under either (a) or (b) for the group, plus the three conditions that are common to all groups $d \leqq c \leqq (1-d)$; $d \leqq m \leqq (1-d)$; and $d \leqq y \leqq (1-d)$

| | | | |
|---|---|---|---|
| I | | (a) $m = d$; | $y \geqq c$ |
| | or | (b) $y = (1-d)$ ; | $c \geqq m$ |
| II | | (a) $m = d$; | $c \geqq y$ |
| | or | (b) $c = (1-d)$ ; | $y \geqq m$ |
| III | | (a) $y = d$; | $c \geqq m$ |

| | | | |
|---|---|---|---|
| | or | (b) $c = (1-d)$ ; | $m \geqq y$ |
| IV | | (a) $y = d$; | $m \geqq c$ |
| | or | (b) $m = (1-d)$ ; | $c \geqq y$ |
| V | | (a) $c = d$; | $m \geqq y$ |
| | or | (b) $m = (1-d)$ ; | $y \geqq c$ |
| VI | | (a) $c = d$; | $y \geqq m$ |
| | or | (b) $y = (1-d)$ ; | $m \geqq c$ |

These conditions are general in applying to the dissection of the surfaces of all of the concentric cubes of different linear dimensions, $(1-2d)$. When the surface of the total color solid is considered, $d = 0$ and the statement of the above conditions appears somewhat simpler. As the cube size is reduced to zero (i.e., when $d = 0.5$), the above sets of conditions reduce in each case to the single centroid point, $c = m = y = 0.5$.

Figure 1:
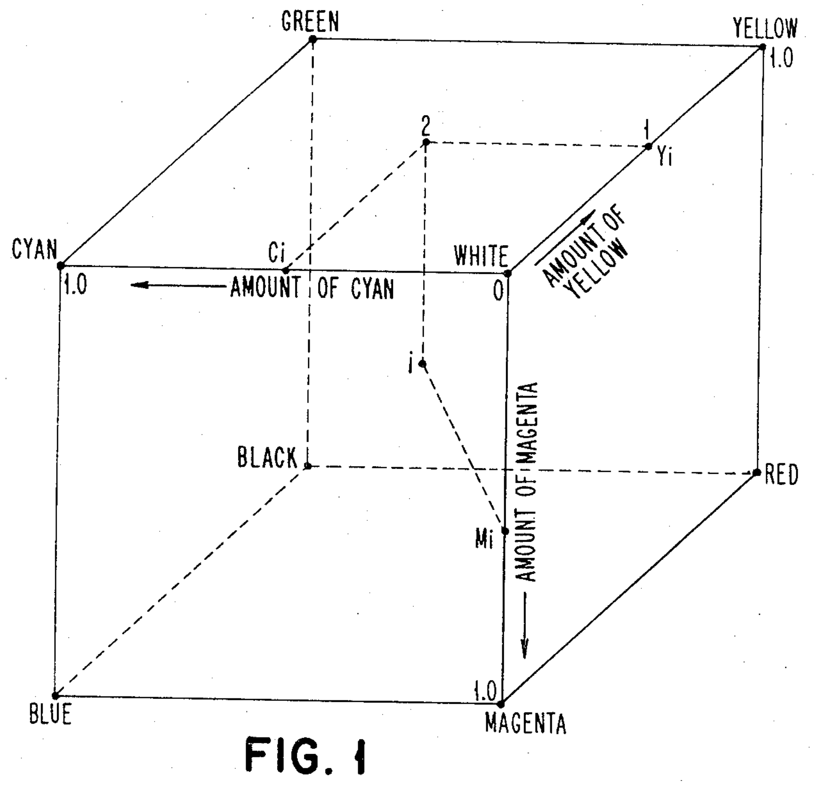
FIG. 1 is a perspective schematic of the prior art color cube.
Figure 2:
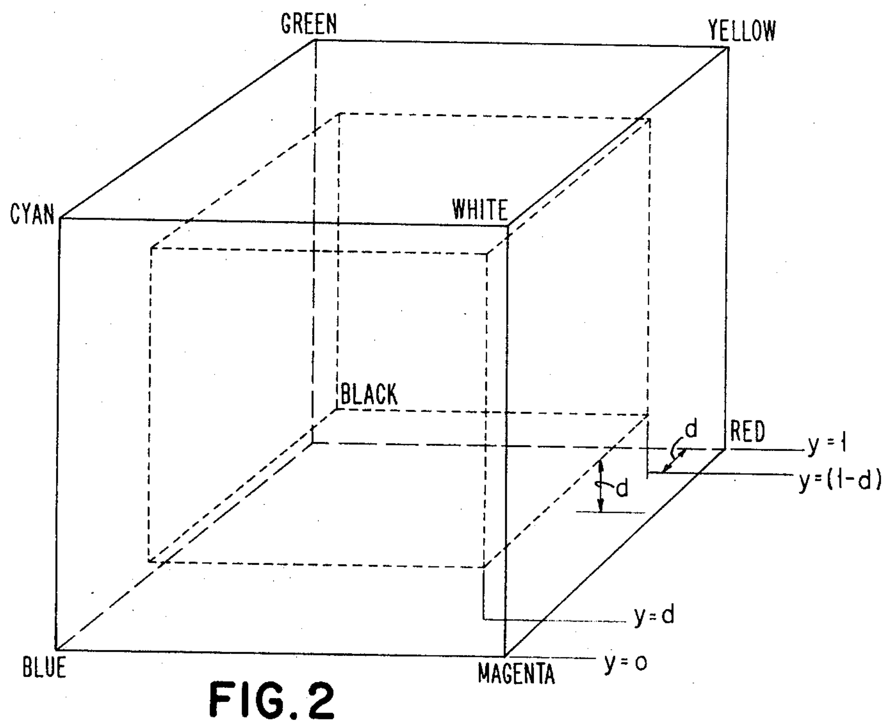
FIG. 2 is a perspective schematic of a color cube showing the relationship of a smaller concentric cube of similar orientation.
Figure 3A:
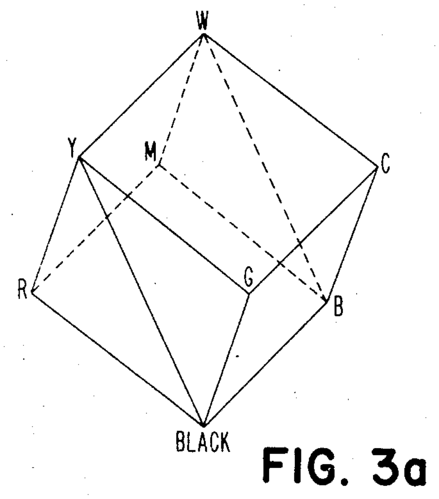
**FIG. 3*a* through *e*** discloses perspective schematics of a dissected cube for defining the limits of individual color charts.
Figure 3B:
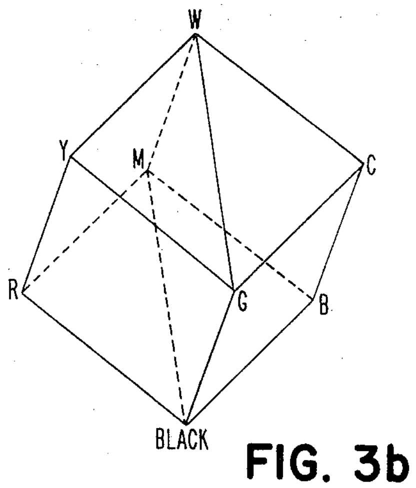
Figure 3C:
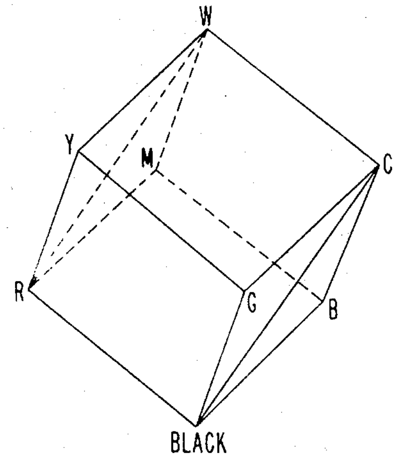
Figure 3D:
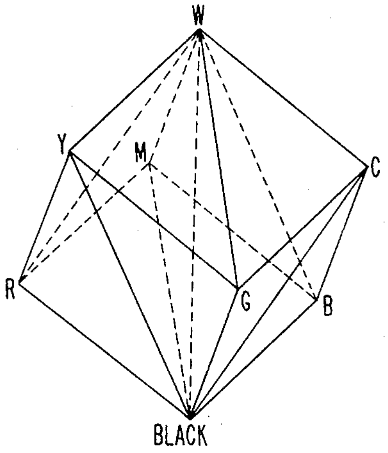
Figure 3E:
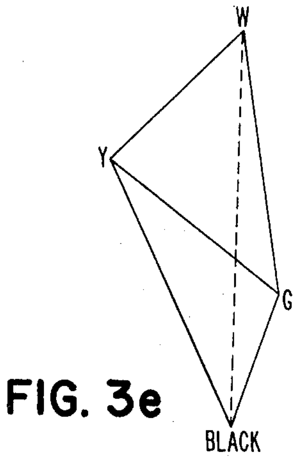
Figure 4A:
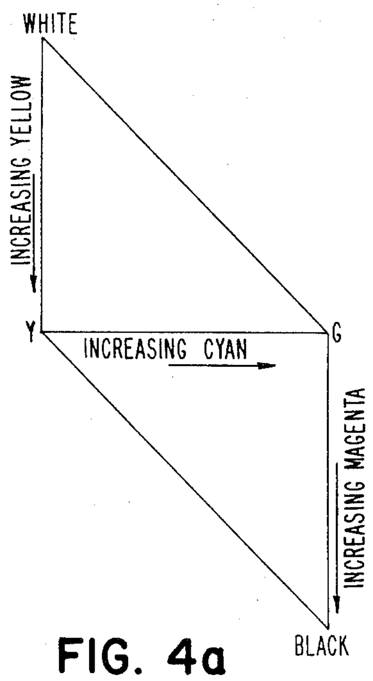
**FIG. 4*a* through *d*** discloses various two-dimensional representations of color charts of the present invention.
Figure 4B:
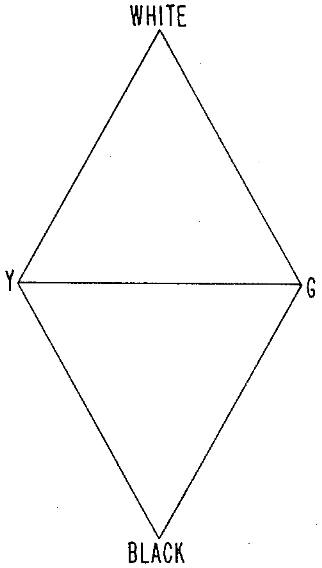
Figure 4C:
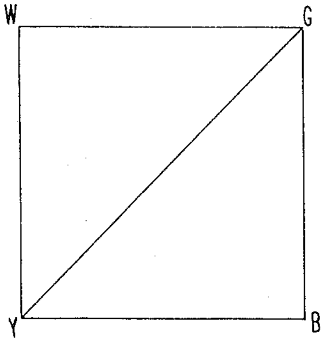

The colors in each of the six groupings defined above can be represented on a plane diagram by simply unfolding, or projecting onto a single plane, the two planes represented in each set. This is illustrated in FIG. 4*a*. Each such figure will contain a light neutral at the top vertex, a dark neutral at the bottom (white and black in the case of figures that represent limit colors), and a variation of hue across the mid section. One of the corners of the figure will be related to one of the primary colorants and the other to one of the colors that is obtained by an equal composite of two primaries. The shape of this figure can be modified to a more regular shape as shown in FIG. 4*b* without harm to the order or usefulness of the arrangement. Again, in this arrangement hue variations are displayed across the figure, from left to right, and variations in the direction of the upper or lower corner represent increasing lightness or darkness, respectively, combined with desaturation toward neutral. The arrangement can be further modified, as shown by example in FIG. 4*c*, to the form of a square. In this case, hue variations are indicated in the direction of one of the diagonals and gradations toward light or dark neutral colors along the other diagonal.

Figure 4D:
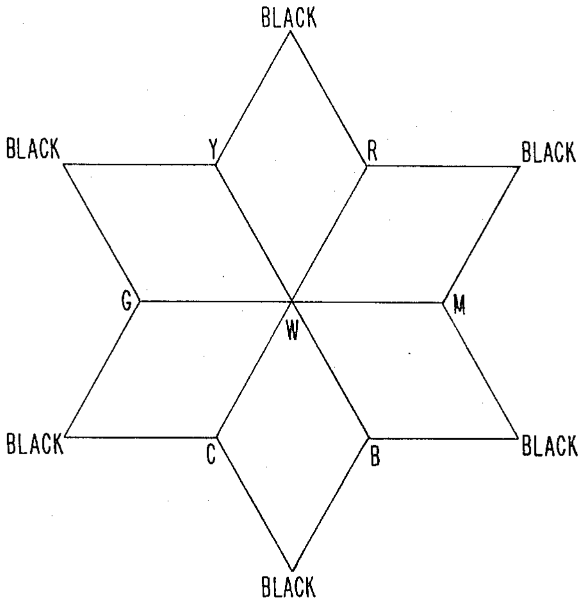
Figure 5:
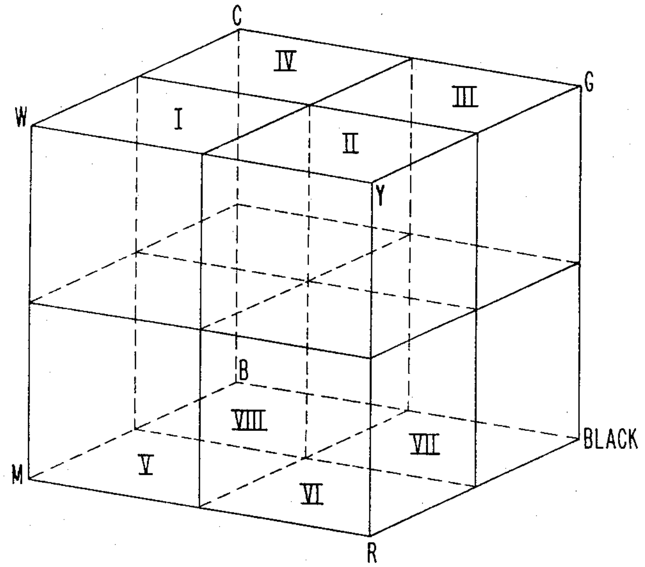
FIG. 5 discloses a division of the color cube by planes that pass through its center and are parallel to the cube's faces.

The six such charts that show a sampling of all of the surface colors of the color cube can be used or arranged in various useful ways. Charts of the type shown in FIG. 4*b* can, for example, be arranged as shown in FIG. 4*d*. In this example the six charts are arranged around the white point with their common edges touching. They can be arranged equally well around the black point. the surface of each of the concentric and similarly oriented cubic volumes can also be divided in other ways for its representation in two-dimensional charts. One of the most useful of these involves a dissection by three mutually perpendicular planes, each of which passes through the center of the volume and is parallel to a different pair of cube's opposite faces. These three planes are specified by the conditions $c = 0.5$, $m = 0.5$, and $y = 0.5$, respectively. This dissection of the cube is illustrated in FIG. 5. The cube is thus divided into eight smaller related cubes, and the surface of the large cube is divided into eight vertex groups, each of which consists of portions of three adjacent faces of the cube that meet at a corner or vertex.

Figure 6:
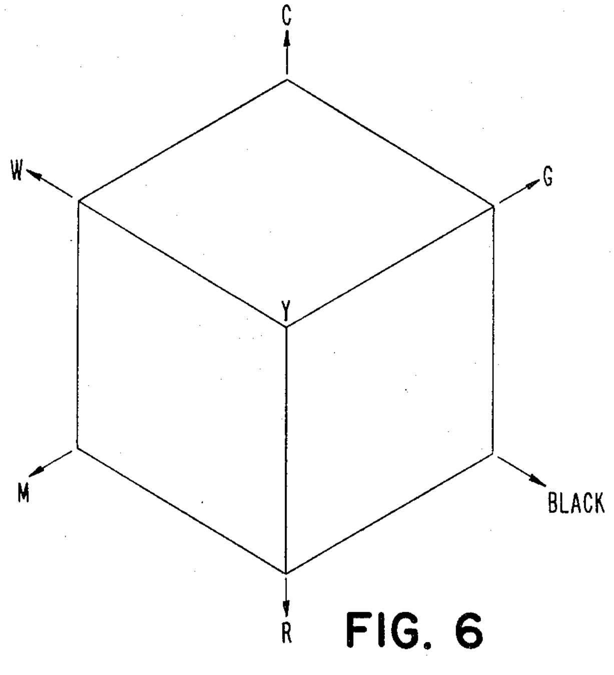
FIG. 6 discloses a plane projection of one of the portions of the cubic surface that has been divided as in FIG. 5.

Each of these vertex groups of the cube's surface can be represented by a projection onto a plane surface that lies perpendicular to that diagonal of the cube that passes through the corner corresponding to the particular section. An example of such a projection is shown in FIG. 6.

Color charts such as this can be juxtaposed in a great variety of arrangements since each of the six edges of the hexagonal projection is common to an edge of one of the other seven charts that represent the various portions of the cube's surface.

The colors included in any one of these eight vertex groups can be quantitatively described. If we consider the sectioning of the surface of one of the concentric and similarly oriented cubic volumes with dimensions of $(1-2d)$ [for the full color solid $d = 0$], as in the previous example, the conditions met by all colors of each set are as follows:

| | | | | |
|---|---|---|---|---|
| Sub-cube I | | | | |
| | | (a) $m = d$, | $d \leqq c \leqq 0.5$, | $d \leqq y \leqq 0.5$ |
| | or | (b) $c = d$, | $d \leqq m \leqq 0.5$, | $d \leqq y \leqq 0.5$ |
| | or | (c) $y = d$, | $d \leqq m \leqq 0.5$, | $d \leqq c \leqq 0.5$ |
| Sub-cube II | | | | |
| | | (a) $m = d$, | $0.5 \leqq y \leqq (1-d)$, | $d \leqq c \leqq 0.5$ |
| | or | (b) $c = d$, | $0.5 \leqq y \leqq (1-d)$, | $d \leqq m \leqq 0.5$ |
| | or | (c) $y = (1-d)$, | $d \leqq c \leqq 0.5$, | $d \leqq m \leqq 0.5$ |
| Sub-cube III | | | | |
| | | (a) $m = d$, | $0.5 \leqq c \leqq (1-d)$, | $0.5 \leqq y \leqq (1-d)$ |
| | or | (b) $y = (1-d)$, | $d \leqq m \leqq 0.5$, | $0.5 \leqq c \leqq (1-d)$ |
| | or | (c) $c = (1-d)$, | $d \leqq m \leqq 0.5$, | $0.5 \leqq y \leqq (1- )$ |
| Sub-cube IV | | | | |
| | | (a) $m = d$, | $d \leqq y \leqq 0.5$, | $0.5 \leqq c \leqq (1-d)$ |
| | or | (b) $c = (1-d)$, | $d \leqq m \leqq 0.5$, | $d \leqq y \leqq 0.5$ |
| | or | (c) $y = d$, | $d \leqq m \leqq 0.5$, | $0.5 \leqq c \leqq (1-d)$ |
| Sub-cube V | | | | |
| | | (a) $y = d$, | $d \leqq c \leqq 0.5$, | $0.5 \leqq m \leqq (1-d)$ |
| | or | (b) $c = d$, | $d \leqq y \leqq 0.5$, | $0.5 \leqq m \leqq (1-d)$ |
| | or | (c) $m = (1-d)$, | $d \leqq y \leqq 0.5$, | $d \leqq c \leqq 0.5$ |
| Sub-cube VI | | | | |
| | | (a) $c = d$, | $0.5 \leqq y \leqq (1-d)$, | $0.5 \leqq m \leqq (1-d)$ |
| | or | (b) $y = (1-d)$, | $d \leqq c \leqq 0.5$, | $0.5 \leqq m \leqq (1-d)$ |
| | or | (c) $m = (1-d)$, | $0.5 \leqq y \leqq (1-d)$, | $d \leqq c \leqq 0.5$ |
| Sub-cube VII | | | | |
| | | (a) $y = (1-d)$, | $0.5 \leqq c \leqq (1-d)$, | $0.5 \leqq m \leqq (1-d)$ |
| | or | (b) $c = (1-d)$, | $0.5 \leqq y \leqq (1-d)$, | $0.5 \leqq m \leqq (1-d)$ |
| | or | (c) $m = (1-d)$, | $0.5 \leqq y \leqq (1-d)$, | $0.5 \leqq c \leqq (1-d)$ |
| Sub-cube VIII | | | | |
| | | (a) $y = d$, | $0.5 \leqq c \leqq (1-d)$, | $0.5 \leqq m \leqq (1-d)$ |
| | or | (b) $c = (1-d)$, | $d \leqq y \leqq 0.5$, | $0.5 \leqq m \leqq (1-d)$ |
| | or | (c) $m = (1-d)$, | $0.5 \leqq c \leqq (1-d)$, | $d \leqq y \leqq 0.5$ |

A number of other embodiments of the present invention are also possible. In each case, the sampling of colors in any one color chart will consist, as in the examples above, of colors from the surface of one of a series of cubes that are concentric and similarly oriented in color space. Thus, all of the colors in any one chart will be colors that lie in a uniform proportionate distance between the limit colors and the centroid color of the color solid. One series of such charts will show a sampling of all of the limit colors of the color solid: that is, the most widely variant colors that can be produced by the given set of colorants on the given base.

In determining the color gamut shown in any single color chart, the surface of the cube is divided, in each case, in one of a variety of ways such that any one color chart contains colors from more than one face of the cube that is represented. This collection of colors within a chart is represented in a two-dimensional projection or array that provides a systematic arrangement of the colors, and that permits the juxtaposition of two or more such charts at the common edges of each in order to provide a continuous arrangement of their combined color gamuts.

Another useful property of the present invention is that a number of color charts that represent corresponding portions of the surfaces of each of a series of progressively smaller concentric cubes of the color space can be arranged in systematic order to show a progressive sampling of a portion of the volume of color space. Such a series indicates the colors obtained when a given range of limit colors is progressively modified toward the color of the centroid color of the color space, this centroid color being a medium gray in the ideal case.

Thus the present invention provides a versatile systematic sampling and representation of all colors producible by a colorant system, and, in distinction over prior art has all of the properties and advantages that are described above.

While the above description discloses the preferred method and apparatus of a color chart of the present invention, it should be clear that various modifications are possible within the ordinary skill of craftsmen in this art and accordingly, the scope of the present invention should be determined solely from the following claims.

What is claimed is:

1. A color order system comprising a series of two-dimensional color charts in which the displayed colors are obtained by systematic variations of the combination of at least three independently variable colorants, the colors that are displayed in any one of the charts being those that are represented by contiguous portions of two or more faces of one of a series of concentric and similarly oriented cubic volumes that range in size from zero to the full volume of a basic color-order space, the color space being cubic and having a coordinate system of three axes, each of which represents varying amounts, ranging from zero to a maximally effective amount, of one of the primary colorants.

2. A color order system as in claim 1, in which each of the color charts is a two-dimensional arrangement of a range of colors that are represented by contiguous triangular halves of two faces of one of the concentric and similarly oriented cubic volumes of color space, the limits of each such chart being defined by dividing the represented cubic surfaces into six portions of equal size by the intersections of the cubic surface with three separate planes, each of which represents all of those colors for which the effective amounts of each of a particular pair of the component primary colorants are equal, each such plane passing through two different pairs of diagonally opposed corners of the cubic color space.

3. A color order system as in claim 1, in which each of the color charts is a two-dimensional arrangement of a range of colors that are represented by mutually contiguous square quarters of three faces of one of the concentric and similarly oriented cubic volumes of color space, the limits of each such chart being defined by dividing the represented cubic surface into eight portions of equal size by the intersections of the cubic surface with three separate planes, each of which represents a constant half-effective amount of one of the primary colorants, and each of which passes through the center of the color cube and is parallel to a different pair of the cube's faces.

4. A color order system as in claim 1, in which each of the two-dimensional color charts is modified to the shape of a rhombus that is formed from two contiguous equilateral triangles, the opposite acute corners of the rhombus representing mixtures of equal amounts of the primary colorants, in minimum and maximum amounts, respectively, and the short diagonal of which represents a variation of hue.

5. A color order system as in claim 4, in which the six rhombus-shaped charts that represent the surface of a color cube are juxtaposed at their common borders to form a single and continuous two-dimensional color chart in which the center of the chart represents an equal mixxture of a minimum amount of each of the primary colorants and the outermost points represent an equal mixture of a maximum amount of each of the primary colorants.

6. A color order system as in claim 4 in which the six rhombus-shaped charts that represent the surface of a color cube are juxtaposed at their common borders to form a single and continuous two-dimensional color chart in which the center of the chart represents an equal mixture of a maximum amount of each of the primary colorants and the outermost points represent an equal mixture of a minimum amount of each of the primary colorants.

7. A color order system as in claim 4, in which each of the two-dimensional rhombus-shaped color charts has been further modified to the shape of a square.

8. A color order system as in claim 1, in which each of a series of two-dimensional color charts displays colors represented by similar portions of the surfaces of a complete series of progressively smaller, concentric and similarly oriented cubic volumes of the color space, ranging from the outermost cubic surface that represents the limit colors, being the most extreme colors producible by the set of primaries, down to a cube of zero volume, said series of color charts indicating the colors obtained as a given range of limit colors is progressively modified toward the centroid color of the color space, said centroid representing an equal or neutral mixture of one-half strength of the component primary colorants.

* * * * *